(12) United States Patent
Keen et al.

(10) Patent No.: US 10,977,288 B2
(45) Date of Patent: Apr. 13, 2021

(54) METHODS AND SYSTEMS FOR MANAGING CONTENT TRANSLATIONS (71) Applicant: INTERNATIONAL BUSINESS MACHINES CORPORATION, Armonk, NY (US)

(72) Inventors: Martin Keen, Cary, NC (US); Todd Kelsey, Rochester, MN (US); Robert Richter, Rochester, MN (US); Michael Iantosca, Wake Forest, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 123 days.

(21) Appl. No.: 16/269,257

(22) Filed: Feb. 6, 2019

(65) Prior Publication Data
US 2020/0250214 A1    Aug. 6, 2020

(51) Int. Cl.
*G06F 40/40*    (2020.01)
*G06F 16/35*    (2019.01)
*G06F 40/30*    (2020.01)

(52) U.S. Cl.
CPC ............. *G06F 16/35* (2019.01); *G06F 40/30* (2020.01); *G06F 40/40* (2020.01)

(58) Field of Classification Search
CPC .... G06F 16/113; G06F 16/122; G06F 16/172; G06F 16/1727; G06F 16/173; G06F 16/1737; G06F 16/1827; G06F 16/35; G06F 16/353; G06F 16/355; G06F 16/358; G06F 16/958; G06F 40/40; G06F 40/20; G06F 40/42; G06F 40/44; G06F 40/45; G06F 40/47; G06F 40/49; G06F 40/51; G06F 40/55; G06F 40/56; G06F 40/58; G06F 40/30; G06F 40/35; G06F 17/289; G06F 17/28; G06F 9/4448; G06F 9/454; G10L 15/005; G10L 15/16
USPC ...... 704/1–10; 707/661, 662, 663, 664, 665, 707/666, 667, 668, 669, 670, 671, 687, 707/688, 689, 692, 694, 702
See application file for complete search history.

(56) References Cited

U.S. PATENT DOCUMENTS

| 9,690,780 | B2 | 6/2017 | Davidse et al. |
| 2014/0052434 | A1* | 2/2014 | Bank ....................... G06F 40/58 704/2 |
| 2015/0339293 | A1* | 11/2015 | Davidse .................. G06F 40/58 704/2 |
| 2018/0052832 | A1 | 2/2018 | Anglin et al. |
| 2018/0143975 | A1 | 5/2018 | Casal et al. |

FOREIGN PATENT DOCUMENTS

JP    2018512671 A    3/2016

* cited by examiner

*Primary Examiner* — Leshui Zhang
(74) *Attorney, Agent, or Firm* — Griffiths & Seaton PLLC (57) ABSTRACT

Embodiments for managing content by one or more processors are described. Usage of a plurality of first content portion translations by at least one user is monitored. The plurality of first content portion translations is stored on at least one database. Each of the plurality of first content portion translations is analyzed. A value of maintaining a selected one of the plurality of first content portion translations or a second content portion translation on the at least one database is calculated based on the monitoring of the usage of the plurality of first content portion translations and the analyzing of each of the plurality of first content portions translations.

21 Claims, 7 Drawing Sheets

METHODS AND SYSTEMS FOR MANAGING CONTENT TRANSLATIONS

BACKGROUND OF THE INVENTION

Field of the Invention

The present invention relates in general to computing systems, and more particularly, to various embodiments for managing translations of content.

Description of the Related Art

The translation of content (e.g., documents) into multiple languages (e.g., natural or spoken languages, such as English, French, Spanish, etc.) is a time-consuming and expensive task. In some instances, documents are legally required to be made available in one or more specific languages. For example, documentation provided with at least some products in Canada must be provided in both English and French. In other instances, content translation is performed based on expected need (e.g., what a manager or administrator anticipates is needed or desired).

As one example in which documents are often provided in multiple languages (and/or translated into multiple languages), consider online document databases or repositories. Recently, some such databases have had approximately one billion words translated per year. The translations sometimes include a combination of exact match pairs, which is typically automated, and "fuzzy" match pairs, which often requires a human translator. The cost of such translations may be in the millions of dollars per year for some organizations that manage such databases, and may be as much as hundreds of millions of dollars per year globally.

SUMMARY OF THE INVENTION

Various embodiments for managing content by one or more processors are described. In one embodiment, by way of example only, a method for managing content, again by one or more processors, is provided. Usage of a plurality of first content portion translations by at least one user is monitored. The plurality of first content portion translations is stored on at least one database. Each of the plurality of first content portion translations is analyzed. A value of maintaining a selected one of the plurality of first content portion translations or a second content portion translation on the at least one database is calculated based on the monitoring of the usage of the plurality of first content portion translations and the analyzing of each of the plurality of first content portions translations.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As discussed above, the translation of content (e.g., documents) into multiple languages (e.g., natural, spoken, and/or ordinary languages, such as English, French, Spanish, etc.) is a time-consuming and expensive task. In some instances, documents are legally required to be made available in one or more specific languages. For example, documentation provided with at least some products in Canada must be provided in both English and French. In other instances, content translation is performed based on expected need (e.g., what a manager or administrator anticipates is needed or desired).

As one example in which documents are often provided in multiple languages (and/or translated into multiple languages), consider online document databases or repositories. Recently, some such databases have had approximately one billion words translated per year. The translations sometimes include a combination of exact match pairs, which is typically automated, and "fuzzy" match pairs, which often requires a human translator.

For some organizations that manage such databases or content, the cost of performing the translations may be in the millions of dollars per year. On a global scale, the total cost may be as much as hundreds of millions of dollars per year.

Thus, there is a need for methods and systems for managing content (and/or the translations thereof) that, for example, minimizes any unnecessary cost and/or utilization of resources with respect to translating content from one language to another and/or maintaining (e.g., storing) a particular piece of content, such as an instance of the content in a particular language.

To address these needs, some embodiments described herein provide methods and systems for managing content (and/or the translations thereof) that cognitively derive the utility (and/or value) of content translated into a particular language. The methods and systems described herein may also forecast the value of performing a translation on a content portion (e.g., translating a particular document from one language to another).

In some embodiments, systems and/or methods are provided that perform cognitive competitive analysis, documentation usage analysis, and user impact analysis to derive the value (e.g., to a particular organization) of translated content. In some embodiments, the systems and/or methods may (also) forecast the value of translating given content into other languages, including, for example, generating insights related to the expected utility of the translations.

In some embodiments, the usage (or utilization of, accessing of, etc.) of content (e.g., and/or translations thereof in one or more languages) stored on one or more databases is tracked or monitored and a record thereof is stored or saved (e.g., the number of times the content is accessed, the profile and/or identification of the users, etc.). The system may perform a cognitive document analysis on the content (e.g., via natural language processing) to understand the content, classify the content, determine the intended audience, etc.

In some embodiments, the value of the content (i.e., a content portion already stored on the database) is determined (or calculated) with respect to a particular user (e.g., an actual user or a model/hypothetical user). Such a determination may utilize a competitive analysis, the content usage, and user impact analysis, as described in greater detail below. The system (and/or method) may then perform an impact analysis for non-translated content (e.g., content not translated into one or more particular language).

In some embodiments, using the above, the system then generates insights (or determines correlations) with respect to an actual value and forecasted value of content translated into one or more particular languages. This process (and/or other processes described herein) may be performed utilizing a cognitive analysis.

The processes described herein may utilize various information or data sources associated with users (e.g., user who access content and/or may potentially access content) and/or the content (e.g., content already stored on and/or may potentially be stored on the database(s)). With respect to users, the data sources may include, for example, any available data sources associated with the user. For example, in some embodiments, a profile (e.g., a cognitive profile) for the user(s) may be generated. Data sources that may be use used to generate a cognitive profile for the user(s) may include any appropriate data sources associated with the user that are accessible by the system (perhaps with the permission or authorization of the user). Examples of such data sources include, but are not limited to, communication sessions and/or the content (or communications) thereof (e.g., phone calls, video calls, text messaging, emails, in person/face-to-face conversations, etc.), a profile of (or basic information about) the user (e.g., job title, place of work, length of time at current position, family role, etc.), a schedule or calendar (i.e., the items listed thereon, time frames, etc.), projects (e.g., past, current, or future work-related projects), location (e.g., previous and/or current location and/or location relative to other users), social media activity (e.g., posts, reactions, comments, groups, etc.), browsing history (e.g., web pages visited), and online purchases.

As mentioned above, in some embodiments, the methods and systems described herein utilize a cognitive analysis that is performed on the available data sources and/or content. The cognitive analysis may also include classifying natural language, analyzing tone, and analyzing sentiment (e.g., scanning for keywords, key phrases, etc.) with respect to, for example, content and communications sent to and/or received by users, and/or other available data sources. In some embodiments, natural language processing (NLP), Mel-frequency cepstral coefficients (MFCCs), and/or region-based convolutional neural network (R-CNN) pixel mapping (e.g., for images/videos sent to chatbots), as are commonly understood, are used. Over time, the methods and systems described herein may determine correlations (or insights) between content (or content portions, content portion translations, etc.) and users that may utilize the content (or potentially utilize the content), which may be used to determine or calculate a value for maintaining a translation of one or more particular content portions in one or more languages and/or translating a content portion from one language to another. Feedback received from (or provided by) users and/or administrators may be utilized, which may allow for the performance of the system to improve with continued use.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the management of content (or content translations) as described herein. Utilizing the models, the performance (or operation) of the system (e.g., utilizing/based on new inputs) may be predicted and/or the performance of the system may be optimized by investigating how changes in the input(s) effect the output(s).

It should be understood that as used herein, the term "computing node" (or simply "node") may refer to a computing device, such as a mobile electronic device or a desktop computer, and/or an application, such a chatbot, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by the individuals on such computing devices.

It should also be understood that as used herein, the terms "content," "content portion(s)," "content portion translations," and the like may refer to a piece or portion of content as translated into a particular language (e.g., English, French, Spanish, etc.), regardless of the language in which the content was originally composed/created. For instance, "content translation," "content portion translation," or simply "translation" may refer to an instance of content in a particular language, including the language in which the content was originally created or an instance of content after it has been translated from one language (e.g., the original or a first language) to another (or second) language.

In particular, in some embodiments, a method for managing content by one or more processors is provided. Usage of a plurality of first content portion translations by at least one user is monitored. The plurality of first content portion translations is stored on at least one database. Each of the plurality of first content portion translations is analyzed. A value of maintaining a selected one of the plurality of first content portion translations or a second content portion translation on the at least one database is calculated based on the monitoring of the usage of the plurality of first content portion translations and the analyzing of each of the plurality of first content portions translations.

The calculating of the value of maintaining the selected one of the plurality of first content portion translations or the second content portion translation on the at least one database may further be based on information associated with each of the at least one user, another user, or a combination thereof.

The analyzing of each of the plurality of first content portion translations may be performed utilizing natural language processing. The calculating of the value of maintaining the selected one of the plurality of first content portion translations or the second content portion translation on the at least one database may be performed utilizing a cognitive analysis. Each of the plurality of first content portion translations may be associated with one of a plurality of natural languages.

The calculating of the value of maintaining the selected one of the plurality of first content portion translations or the second content portion translation on the at least one database may include calculating of the value of maintaining the second content portion translation on the at least one database. The maintaining of the second content portion translation on the at least one database may include translating the second content portion translation from a first natural language to a second natural language.

The calculating of the value of maintaining the selected one of the plurality of first content portion translations or the second content portion translation on the at least one database may include calculating of the value of maintaining the second content portion translation on the at least one database. The second content portion translation may be analyzed. The calculating of the value of maintaining the second content portion translation on the at least one database may further be based on the analyzing of the second content portion translation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
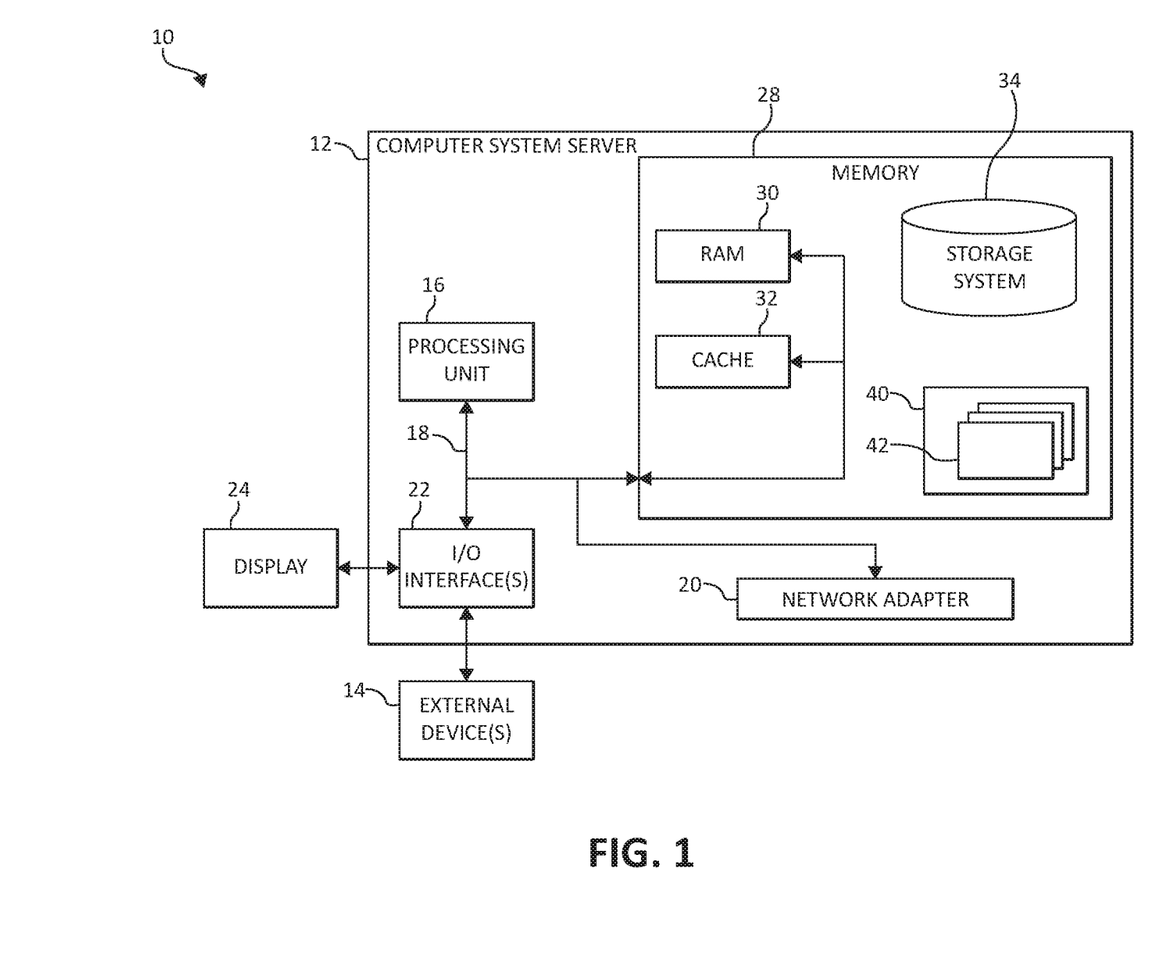
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
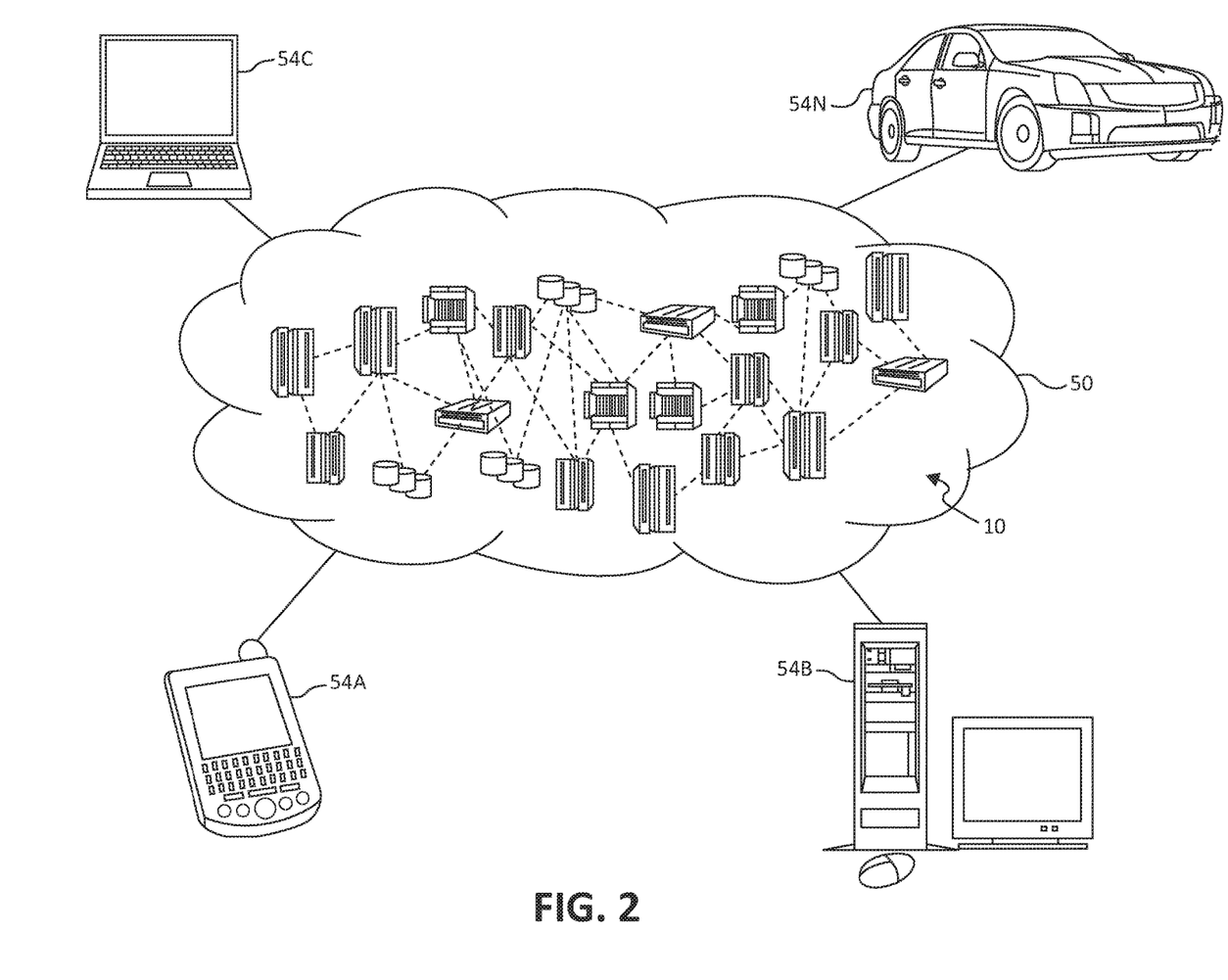
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
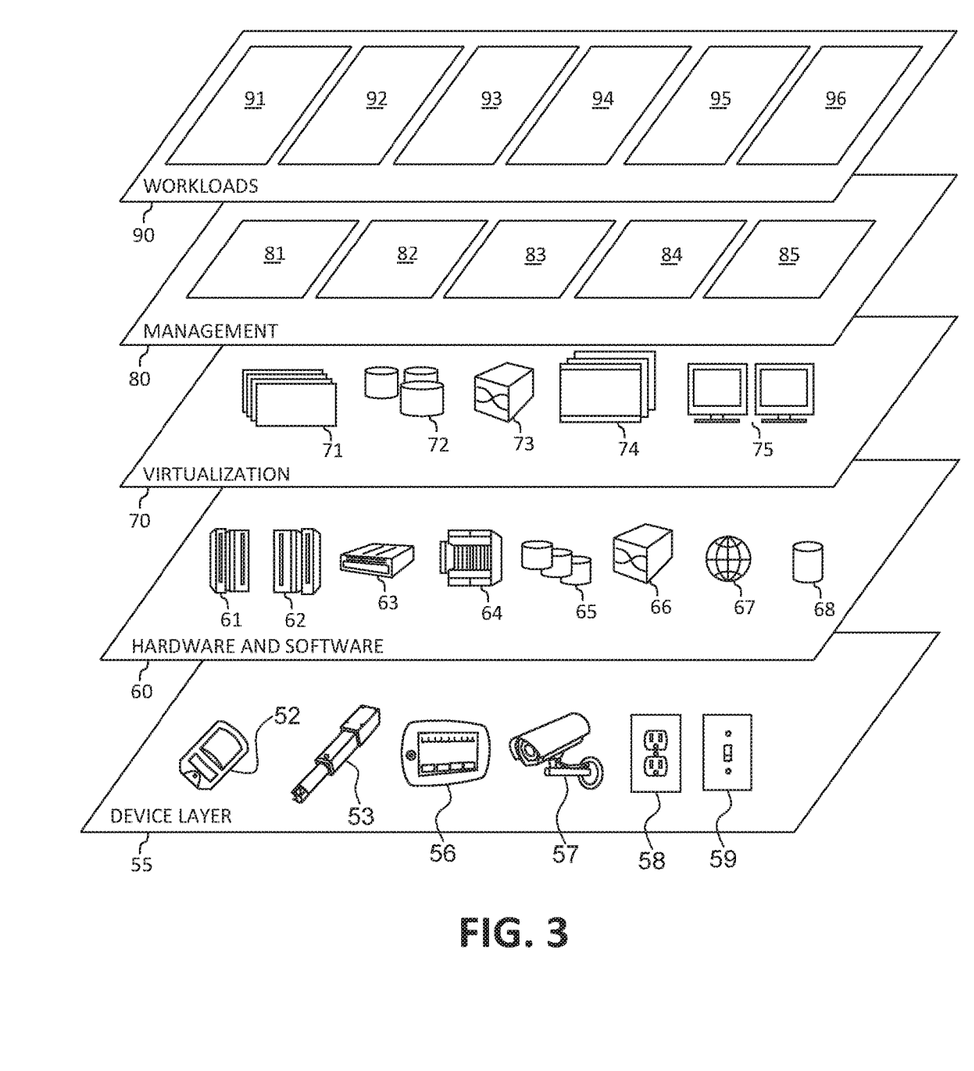
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing content (and/or translations thereof) as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, some embodiments described herein provide methods and systems for managing content (and/or the translations thereof) that cognitively derive the utility (and/or value) of content translated into a particular language. The methods and systems described herein may also forecast the value of particular translations (e.g., translating a particular document or content portion from one language to another).

In some embodiments, systems and/or methods are provided that perform cognitive competitive analysis, documentation usage, and user impact analysis to derive the value (e.g., to a particular organization) of translated content. In some embodiments, the systems and/or methods may (also) forecast the value of translating given content into other languages, including, for example, generating insights related to the expected utility of the translations.

Figure 4:
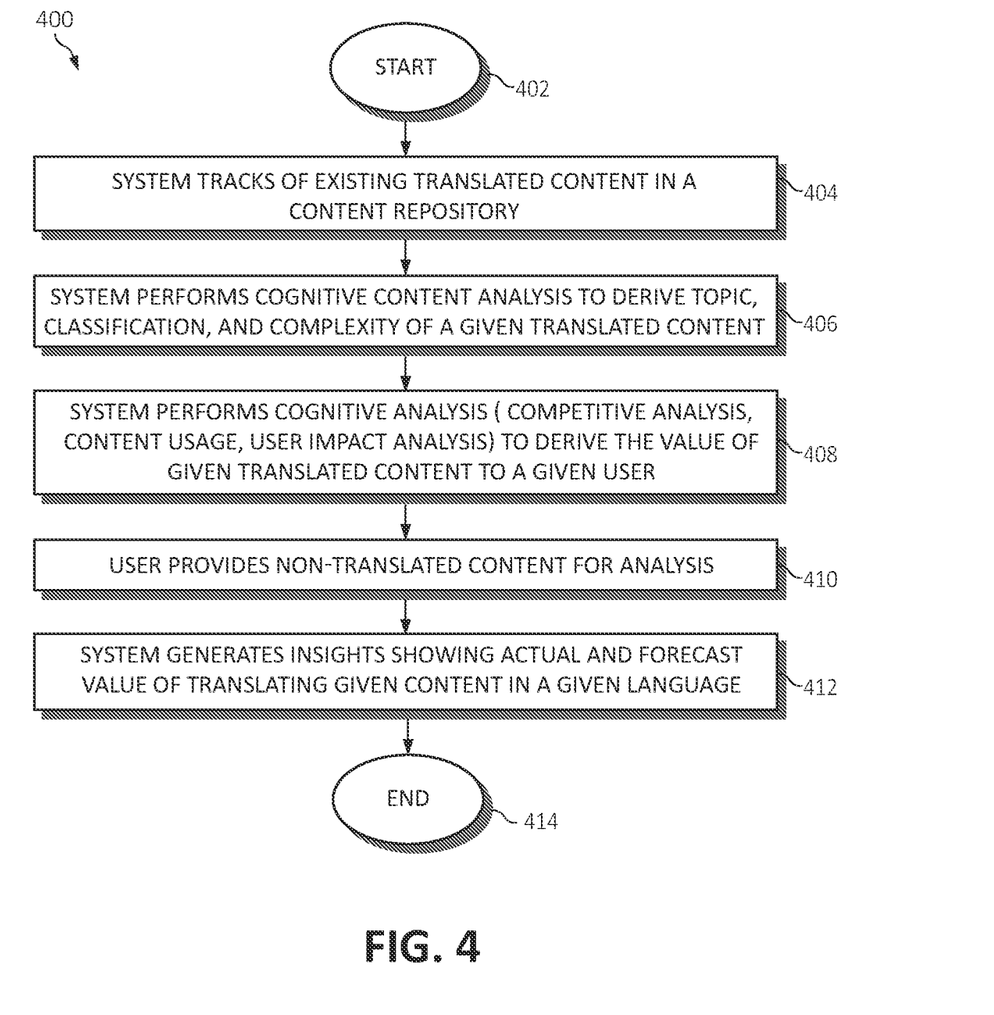
FIG. 4 is a flow chart of a method for managing content according to an embodiment of the present invention.

FIG. 4 is a flow chart of a method (and/or operation of a system) 400 for managing content according to some embodiments described herein. The method (and/or corresponding system) 400 may be implemented or performed by any suitable computing system described above. At block (or step) 402, the method 400 begins (or starts) with, for example, one or more content portion translation (or translated content, document(s), etc.) being stored or maintained on a repository (e.g., one or more databases, memory devices, computing systems, etc.). For example, the repository may be available to users online (or through the Internet) and allow the users to select, view, download, etc. any content stored thereon, in any available language (i.e., any stored translations of the content portions). Examples of such documents (or content) include user manuals, technical specifications, scholarly articles, tutorials, advertising materials, etc, which may be in the form of text documents, slide presentations, images (e.g., with annotations), and other reading materials. However, it should be understood that the embodiments described herein may also be applied to audio and/or video content/media/files.

Figure 5:
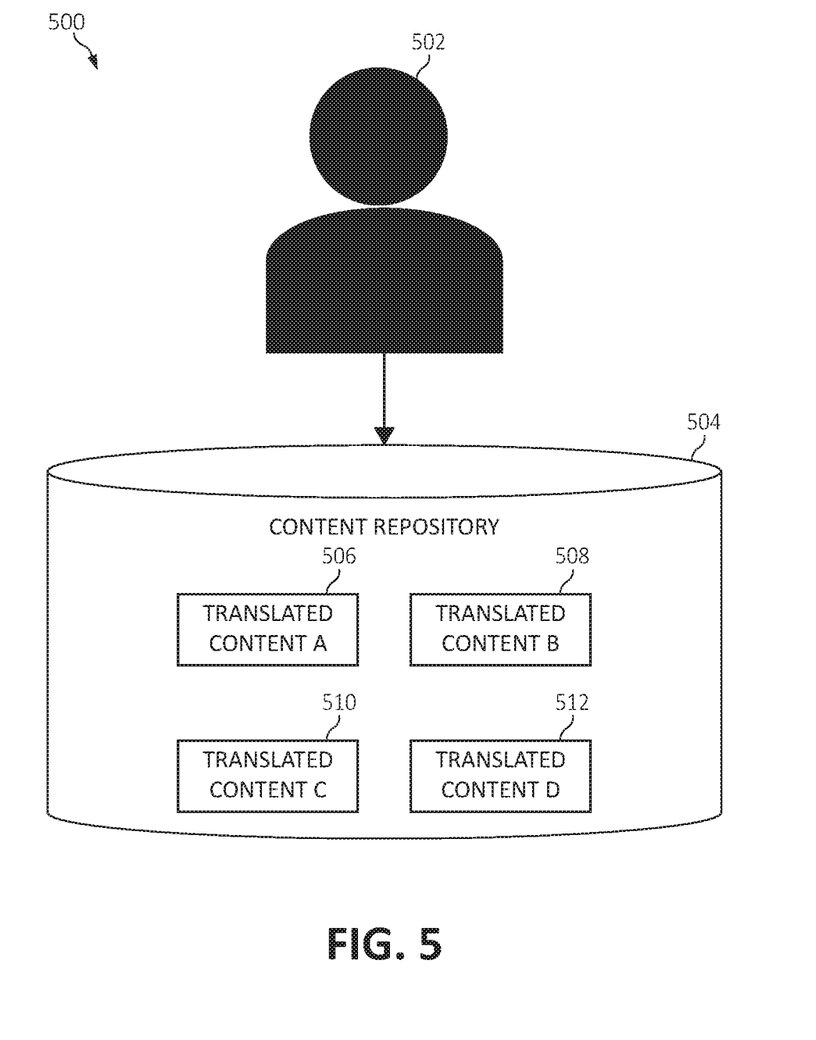
FIG. 5 is a simplified block diagram of a computing environment according to an embodiment of the present invention.

At block 404, the system tracks (and/or monitors) the usage or the translated content on the repository. For example, the system may detect each time any of the stored content portions is selected, accessed, opened, downloaded, viewed, utilized, etc. by any users. FIG. 5 is a simplified block diagram of a computing environment 500, illustrating a user 502 accessing a repository 504 (e.g., through an online channel, the Internet, etc.) and/or content stored thereon. In the example shown, the repository 504 has four content portion translations 506-510 stored thereon (e.g., Translated Content A, Translated Content B, Translated Content C, and Translated Content D).

Any information associated with the usage of the content may be stored, such as the number of time the content is accessed, information related to the user(s) who access the content (e.g., information in a profile of the user if the user is registered and/or logged in), and any other information which may be used to identify the user (e.g., if the user is not logged in, such as an internet protocol (IP) address).

Referring again to FIG. 4, at block 406, the system performs a cognitive content analysis (or content analysis) to derive, for example, the topic(s), classification(s), and complexity a given content portion translation (e.g., content portion translations 506-510 in FIG. 5). For example, for a particular (or each) content portion (or segment) stored in the repository, the system may analyze the native (or original) language content portion (e.g., in English) and the translated versions of the same content portion (e.g., translated to French, Spanish, etc.).

The analysis may utilize natural language processing (NLP). In particular, in some embodiments, the system may utilize natural language understanding and natural language classifier processes (and/or services). Natural language understanding may be used to, for example, analyze content (e.g., text) to derive concepts, entities, keywords, categories, sentiment, emotion, relations, and semantic roles. Natural language classification may be used to, for example, break down language into various classifications or groups. Through such an analysis, the system may derive or determine, for example, what a content portion is about (i.e., the classifications), the intended audience (or viewers, consumers, etc.) of content, the complexity of the information in the content, and/or the difference(s) (or "delta") between the native/original content portion (i.e., the content portion in it's original language) and the versions of the content portion translated into different languages.

Still referring to FIG. 4, at block 408, the system performs, for example, a cognitive analysis to derive (or determine or calculate) the value of a given translated content portion to a given user (e.g., a particular user who has previously accessed the repository and/or may potentially access the repository in the future or a "model" or "hypothetical" user with a particular profile). As input, the system may receive who has accessed one or more particular content portions on the repository (as determined in block 404) and information about the content (as determined in block 406).

In some embodiments, this analysis includes and/or is based on a competitive analysis, content usage, and user impact analysis. The competitive analysis may consider if similar information (or content) is made available in translated form by a competitor, and if so, in which languages. For example consider a content segment about caching on an application server. Whether or not a translated version of similar content exist in a document repository managed by a competitor exists/is maintained on the competitor's repository may be considered. As such, in such an analysis, the system may analyze competitive documentation corpuses for similarly classified content offered by competitors.

The content usage may be related to whether or not particular users typically seek or utilize similarly classified content in their native language or some other language. For example, whether French-speaking user typically reads caching information for products in French or a version of the content in another language, such as English, may be considered. To determine this, the system may analyze or search through the documentation browsing (or downloading, accessing, etc.) history for users, which may be compared to information in the profile of the users.

The user impact analysis may be related to the importance of particular users with respect to the offering of particular content (i.e., in a particular language). For example, whether or not a particular user works for an organization that has a working relationship (e.g., a contract) with the organization managing the repository in question may be considered. Other possible considerations may include, for example, whether or not a particular user is a potential customer or existing customer, if they are an existing customer, what their value is to the organization managing the repository in question, and whether or not the user is merely using the content for research (i.e., the user's use of the content is unlikely to lead to financial gain). To determine this, information related to the user and/or the user's profile (e.g., their employer/contracts, organization which with they are affiliated/to which they report, etc.) may be identified and utilized.

Figure 6:
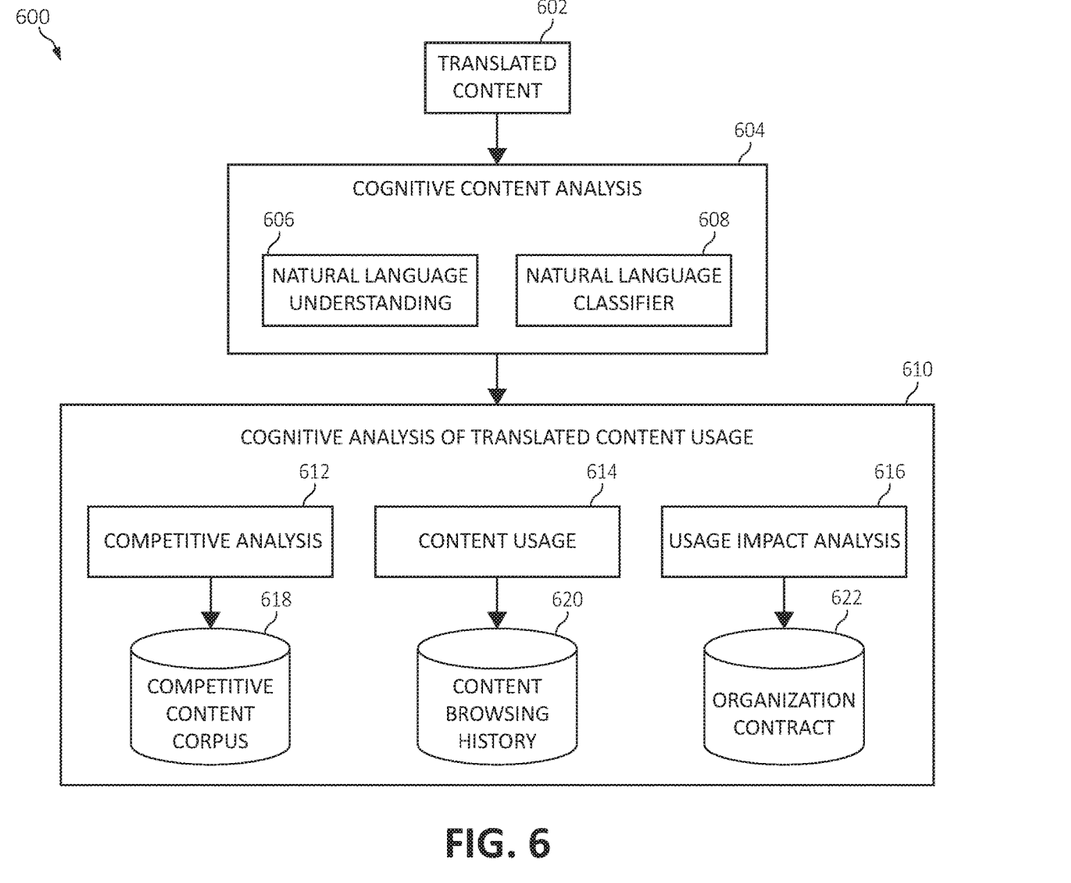
FIG. 6 is a flow chart/block diagram of a method and/or system for analyzing content and determining the value of the content according to an embodiment of the present invention.

Referring now to FIG. 6, a flow chart/block diagram of a method (and/or system) 602 for analyzing content (i.e., a particular content portion translation) and determining the value of the content (i.e., at least with respect to a particular user) is shown, which may be similar to the processes described above with respect to blocks 406 and 408 in FIG. 4.

As shown in FIG. 6, in the depicted embodiment, translated content (or a content portion translation) 602 first undergoes a cognitive content analysis 604. In some embodiments, the cognitive content analysis includes a natural language understanding process 606 and a natural language classifier (or classification) process 608, as described above.

A cognitive value analysis (or more simply "cognitive analysis") 610 is then performed on the translated content 602. In the depicted embodiment, the cognitive analysis 610 includes and/or utilizes a competitive analysis 612, content usage 614, and a user impact analysis 616. As described above, the competitive analysis 612 may utilize the content of a competitive content corpus (or corpuses) 618, while the content usage 614 may be based on the content browsing history 620 of the particular user(s) and the user impact analysis 616 may be based on, for example, an organization contract 622 (i.e., a contact between the organization managing the repository in question and an organization with which the user(s) is associated) and/or other information associated with the user(s).

Referring again to FIG. 4, at block 410, in the depicted embodiment, a user (e.g., a manager or administrator of the repository in question) provides non-translated content for analysis (and/or the system otherwise receives or identifies such content). "Non-translated content" may refer to one or more content portion(s) that has not yet been translated into at least some available languages, regardless of the language in which it was originally composed.

In some embodiments, the system performs an impact analysis for the non-translated content (i.e., the value of generating/maintaining translations of the content in other languages and/or the impact of not having such translations). Such an analysis on the non-translated content may include processes similar to those described above with respect to blocks 406 and 408 in FIG. 4, as performed with respect to translated content. For example, the system may perform a content analysis on the non-translated content, including a natural language understanding process and/or a natural language classifier process, to classify the content, determine the intended audience, etc. Similarly, the system may then perform a cognitive analysis of the classified non-translated content segment, including/based on a competitive analysis, content usage, and user impact analysis, as described above.

Still referring to FIG. 4, at block 412, the system then generates insights (or correlations) showing (and/or indicative of) actual and/or forecasted value of a content portion in a given translated language. Such a process may be performed utilizing a cognitive analysis, and may be performed utilizing the results of the analyses/processes performed at blocks 406, 408, and 410. The insights may be used to determine if an already translated content portion should continue to be hosted or maintained on a content repository and/or forecast the value of translating a content portion from one language to another. In other words, the system may determine or calculate a value related to maintaining a particular content portion translation on the repository and/or a value related to performing a translation on a content portion (e.g., and then maintaining/storing the translation on the repository).

In some embodiments, a value, score, or grade may be calculated in this regard. For example, a numerical value or score (e.g., regarding monetary value) may be calculated (e.g., on any suitable scale using positive and/or negative numbers) and/or a descriptive grade (e.g., "high value," "low value, etc.) may be generated.

Examples of insights that may be indicative of the value (or necessity) of a particular content portion translation may be related to user comprehension of the topic, content (or content portion) complexity, and the value of the audience. For example, with respect to the user comprehension of the topic, if the browsing history indicates that most Spanish-speaking users are comfortable consuming a particular topic in English, a Spanish translation of the content may be determine to be of low value. With respect to content complexity, if natural language understanding indicates that a particular content portion is relatively easy for a non-native speaker to understand, translations of the content into other languages may be determined to be of low value. With respect to the value of the audience, if the number of people accessing an existing translated content segment is low, and those users are determined to be of limited value to an organization, any translations of the content may be considered to be of low value (e.g., the users of the translated pages are unlikely to be associated with an increase in revenue for the organization).

Other examples of such insights may be related to market expectation, usage of similarly classified content, and the difference(s) (or delta) between translations. For example, with respect to market expectation, if competitors offer similar information in particular languages, and translated versions of the content is considered to be expected by the market (e.g., a consensus amongst users and/or potential users), the translations may be considered to be of high value. With respect to the usage of similarly classified content, if other translated content portions on similar topics experience a high rate of utilization from high value users, such translations may be considered to be of high value. With respect to the differences between translations, if the delta between translations is determined to be relatively high (e.g., technical terms to not translate well between the different languages), which may make the content difficult for non-native speakers to understand, the translations may be considered to be of high value.

The calculated value(s) may be presented (e.g., via any suitable communication, such as text message, email, pop-up window on a computing device, etc.) to a manager or administrator of the database(s) on which the content portion translation(s) is stored. The calculated value may then be utilized by the appropriate personnel to make any desired changes to the content stored (e.g., translating a content portion from one language to another, deleting content portion translations with little value, etc.). Feedback may be received from users (e.g., managers, etc.), which may be utilized by the system to improve performance over time.

Figure 7:
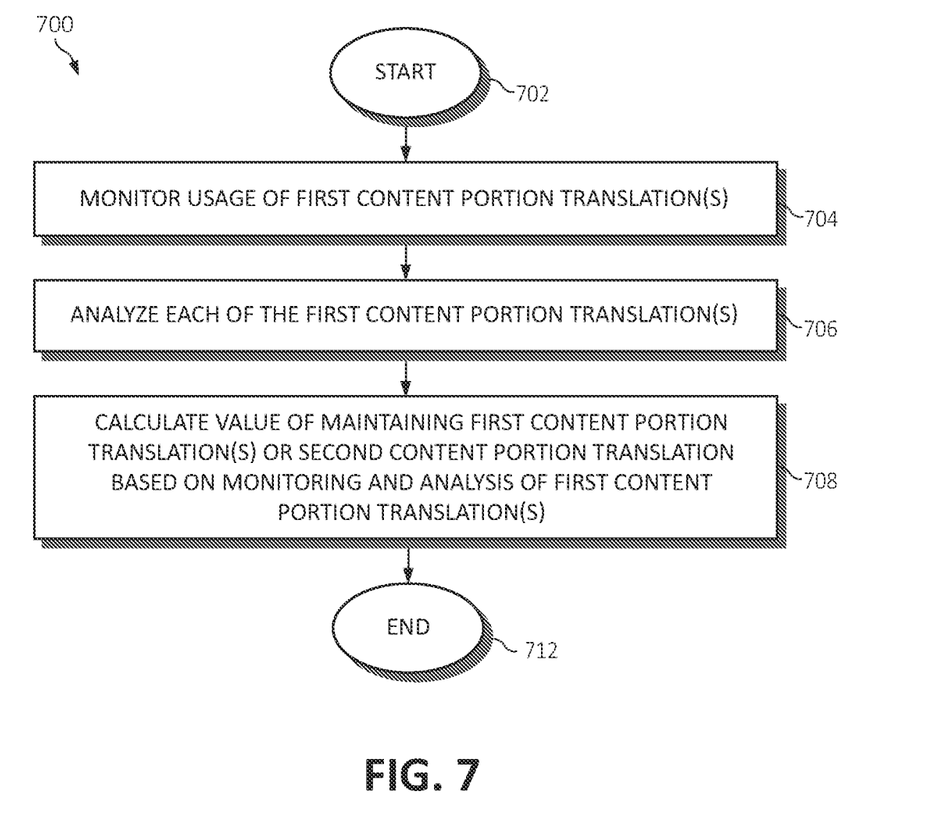
FIG. 7 is a flowchart diagram of an exemplary method for managing content according to an embodiment of the present invention.

Turning to FIG. 7, a flowchart diagram of an exemplary method 700 for managing content (or translations thereof), in accordance with various aspects of the present invention, is provided. Method 700 begins (step 702) with, for example, a plurality of (first) content portions translations (or at least one content portion translation) (i.e., one or more content portion or segment in a particular natural language) being stored on a repository (or at least one database, memory, computing system, etc.). Each of the plurality of first content portion translations may be associated with (i.e., written or composed in) one of a plurality of natural languages, such as English, Spanish, French, etc.

Usage (or accessing, downloading, viewing, etc.) of the plurality of first content portion translations by at least one user (or a plurality of users) is monitored (or tracked) (step 704). The monitoring of the usage may include, for example, tracking the number of times each of the plurality of content portion translations is used, accessed, etc. and who uses the content portion translations (i.e., an identity of the users).

Each of the plurality of first content portion translations is analyzed (step 706). The analyzing of each of the plurality of first content portion translations may be performed utilizing natural language processing (e.g., natural language understanding, natural language classification, etc.).

A value of maintaining a selected one of the plurality of first content portion translations or a second content portion translation (i.e., a content portion translation not yet generated/maintained/stored) on the at least one database is calculated (step 708). The value may be calculated based on, for example, the monitoring of the usage of the plurality of first content portion translations and the analyzing of each of the plurality of first content portions translations. The calculating of the value may further be based on information associated with each of the at least one user, another user (i.e., a user who may potentially utilize the content in the future), or a combination thereof. The calculating of the value may be performed utilizing a cognitive analysis.

If the calculated value is associated with maintaining the second content portion translation, the maintaining of the second content portion translation on the at least one database may include translating the second content portion translation from a first natural language to a second natural language. If the calculated value is associated with maintaining the second content portion translation, the second content portion translation may be analyzed, and the calculating of the value of maintaining the second content portion translation may further be based on the analyzing of the second content portion translation.

Method 700 ends (step 710) with, for example, the calculated value being presented (e.g., via any suitable communication, such as text message, email, pop-up window on a computing device, etc.) to a manager or administrator of the database(s) on which the content portion translation(s) is stored. The calculated value may then be utilized by the appropriate personnel to make any desired changes to the content stored (e.g., translating a content portion from one language to another, deleting content portion translations with little value, etc.). Feedback may be received from users (e.g., managers, etc.), which may be utilized by the system to improve performance over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing content comprising:
   monitoring usage of a plurality of first content portion translations by at least one user, wherein the plurality of first content portion translations is stored on at least one database;
   analyzing each of the plurality of first content portion translations, wherein insights are derived from the analysis; and
   calculating a value of maintaining a selected one of the plurality of first content portion translations or a second content portion translation on the at least one database based on the monitoring of the usage of the plurality of first content portion translations and the analyzing of each of the plurality of first content portions translations, wherein the value is calculated according to the derived insights.

2. The method of claim 1, wherein the calculating of the value of maintaining the selected one of the plurality of first content portion translations or the second content portion translation on the at least one database is further based on information associated with each of the at least one user, another user, or a combination thereof.

3. The method of claim 1, wherein the analyzing of each of the plurality of first content portion translations is performed utilizing natural language processing.

4. The method of claim 1, wherein the calculating of the value of maintaining the selected one of the plurality of first content portion translations or the second content portion translation on the at least one database is performed utilizing a cognitive analysis.

5. The method of claim 1, wherein each of the plurality of first content portion translations is associated with one of a plurality of natural languages.

6. The method of claim 1, wherein the calculating of the value of maintaining the selected one of the plurality of first content portion translations or the second content portion translation on the at least one database includes calculating of the value of maintaining the second content portion translation on the at least one database, and wherein the maintaining of the second content portion translation on the at least one database includes translating the second content portion translation from a first natural language to a second natural language.

7. The method of claim 1, wherein the calculating of the value of maintaining the selected one of the plurality of first content portion translations or the second content portion translation on the at least one database includes calculating of the value of maintaining the second content portion translation on the at least one database, further comprising analyzing the second content portion translation, and the calculating of the value of maintaining the second content portion translation on the at least one database is further based on the analyzing of the second content portion translation.

8. A system for managing content comprising:
   at least one processor that
   monitors usage of a plurality of first content portion translations by at least one user, wherein the plurality of first content portion translations is stored on at least one database;
   analyzes each of the plurality of first content portion translations, wherein insights are derived from the analysis; and
   calculates a value of maintaining a selected one of the plurality of first content portion translations or a second content portion translation on the at least one database based on the monitoring of the usage of the plurality of first content portion translations and the analyzing of each of the plurality of first content portions translations, wherein the value is calculated according to the derived insights.

9. The system of claim 8, wherein the calculating of the value of maintaining the selected one of the plurality of first content portion translations or the second content portion translation on the at least one database is further based on information associated with each of the at least one user, another user, or a combination thereof.

10. The system of claim 8, wherein the analyzing of each of the plurality of first content portion translations is performed utilizing natural language processing.

11. The system of claim 8, wherein the calculating of the value of maintaining the selected one of the plurality of first content portion translations or the second content portion translation on the at least one database is performed utilizing a cognitive analysis.

12. The system of claim 8, wherein each of the plurality of first content portion translations is associated with one of a plurality of natural languages.

13. The system of claim 8, wherein the calculating of the value of maintaining the selected one of the plurality of first content portion translations or the second content portion translation on the at least one database includes calculating of the value of maintaining the second content portion translation on the at least one database, and wherein the maintaining of the second content portion translation on the at least one database includes translating the second content portion translation from a first natural language to a second natural language.

14. The system of claim 8, wherein the calculating of the value of maintaining the selected one of the plurality of first content portion translations or the second content portion translation on the at least one database includes calculating of the value of maintaining the second content portion translation on the at least one database, the at least one processor further analyzes the second content portion translation, and the calculating of the value of maintaining the second content portion translation on the at least one database is further based on the analyzing of the second content portion translation.

15. A computer program product for managing content, the computer program product comprising:
   one or more non-transitory computer readable storage media, and program instructions collectively stored on the one or more non-transitory computer readable storage media, the program instructions executed by one or more processors to cause the one or more processors to:
   monitor usage of a plurality of first content portion translations by at least one user, wherein the plurality of first content portion translations is stored on at least one database;
   analyze each of the plurality of first content portion translations, wherein insights are derived from the analysis; and calculate a value of maintaining a selected one of the plurality of first content portion translations or a second content portion translation on the at least one database based on the monitoring of the usage of the plurality of first content portion translations and the analyzing of each of the plurality of first content portions translations, wherein the value is calculated according to the derived insights.

16. The computer program product of claim 15, wherein the calculating of the value of maintaining the selected one of the plurality of first content portion translations or the second content portion translation on the at least one database is further based on information associated with each of the at least one user, another user, or a combination thereof.

17. The computer program product of claim 15, wherein the analyzing of each of the plurality of first content portion translations is performed utilizing natural language processing.

18. The computer program product of claim 15, wherein the calculating of the value of maintaining the selected one of the plurality of first content portion translations or the second content portion translation on the at least one database is performed utilizing a cognitive analysis.

19. The computer program product of claim 15, wherein each of the plurality of first content portion translations is associated with one of a plurality of natural languages.

20. The computer program product of claim 15, wherein the calculating of the value of maintaining the selected one of the plurality of first content portion translations or the second content portion translation on the at least one database includes calculating of the value of maintaining the second content portion translation on the at least one database, and wherein the maintaining of the second content portion translation on the at least one database includes translating the second content portion translation from a first natural language to a second natural language.

21. The computer program product of claim 15, wherein the calculating of the value of maintaining the selected one of the plurality of first content portion translations or the second content portion translation on the at least one database includes calculating of the value of maintaining the second content portion translation on the at least one database, wherein the program instructions, when executed by the one or more processors, further cause the one or more processors to analyze the second content portion translation, and wherein the calculating of the value of maintaining the second content portion translation on the at least one database is further based on the analyzing of the second content portion translation.

* * * * *